(12) United States Patent
Kano

(10) Patent No.: US 9,634,304 B2
(45) Date of Patent: Apr. 25, 2017

(54) BATTERY PACK

(75) Inventor: Hiroshi Kano, Fukushima (JP)

(73) Assignee: Sony Corporation, Tokyo (JP)

( * ) Notice: Subject to any disclaimer, the term of this patent is extended or adjusted under 35 U.S.C. 154(b) by 803 days.

(21) Appl. No.: 12/648,760

(22) Filed: Dec. 29, 2009

(65) Prior Publication Data

US 2010/0203374 A1  Aug. 12, 2010

(30) Foreign Application Priority Data

Feb. 9, 2009  (JP) ................. 2009-026871

(51) Int. Cl.
| | | |
|---|---|---|
| *H01M 10/0525* | (2010.01) | |
| *H01M 2/10* | (2006.01) | |
| *H01M 10/42* | (2006.01) | |

(52) U.S. Cl.
CPC ....... *H01M 2/1061* (2013.01); *H01M 10/425* (2013.01); *H01M 10/0525* (2013.01)

(58) Field of Classification Search
CPC ............ H01M 2/1061; H01M 10/425; H01M 10/0525
See application file for complete search history.

(56) References Cited

U.S. PATENT DOCUMENTS

| | | | | |
|---|---|---|---|---|
| 2006/0166089 A1* | 7/2006 | Suzuki et al. | ................. | 429/185 |
| 2009/0270140 A1* | 10/2009 | Takahashi | .................. | 455/575.1 |
| 2010/0162558 A1* | 7/2010 | Hiratsuka et al. | ........... | 29/623.1 |

FOREIGN PATENT DOCUMENTS

| | | | | | |
|---|---|---|---|---|---|
| JP | 2003-045492 | * | 2/2003 | ............ | H01M 10/40 |
| JP | 2003-45492 | | 2/2003 | | |
| JP | 2004-214143 | * | 7/2004 | ............. | H01M 2/10 |
| JP | 2005-183242 | * | 7/2005 | ............. | H01M 2/10 |

OTHER PUBLICATIONS

Office Action issued Jun. 21, 2011 in Japan Application No. 2009-026871.

* cited by examiner

*Primary Examiner* — Barbara Gilliam
*Assistant Examiner* — Angela Martin
(74) *Attorney, Agent, or Firm* — Chip Law Group

(57) ABSTRACT

A battery pack includes a battery cell, a circuit board, and a holder. The battery cell includes a battery device covered with a laminate film. The circuit board is connected to the battery cell. The holder includes a cell holder that covers the battery cell and a circuit board holder that covers the circuit board. In battery pack, the circuit board holder covering the circuit board is arranged in a space formed above a terrace portion of the battery cell covered with the cell holder.

16 Claims, 10 Drawing Sheets

BATTERY PACK

BACKGROUND OF THE INVENTION

1. Field of the Invention

The present invention relates to a battery pack. More particularly, the present invention relates to a battery pack incorporated into an electronic apparatus, for example.

2. Description of the Related Art

In recent years, portable electronic apparatuses such as laptop PCs (Personal Computers), cell phones, and PDAs (Personal Digital Assistants) have been prevalent, and as power sources thereof, lithium-ion secondary batteries that have advantages in high voltage, high energy density, and lightweight have been used.

The lithium-ion secondary batteries are widely used as a battery pack that is formed by adding a circuit such as a protection circuit to a battery cell in which a positive electrode, a negative electrode, and a separator and an electrolyte arranged between the positive electrode and the negative electrode are covered with a laminate film.

The battery pack is broadly classified into a so-called hard pack type and soft pack type. In a battery pack of the hard pack type, a battery cell and components including a circuit board are accommodated in a plastic case, for example, and a terminal-shaped output is provided, for example. The battery pack of the hard pack type is used for a laptop PC, for example (see Japanese Patent Application Laid-open No. 2003-045492).

A battery pack of the soft pack type is incorporated into an electronic apparatus. In the battery pack of the soft pack type, a battery cell, a protection circuit, and the like are fixed by an insulating tape or the like, a part of the battery cell is exposed, and an output such as a lead with connector connected to an electronic apparatus main body is provided.

A structural example of the battery pack of the soft pack type in related art will be described. FIG. 14 is an exploded perspective view showing a structural example of the battery pack of the soft pack type in related art. As shown in FIG. 14, in the battery pack, a positive electrode lead 118a and a negative electrode lead 118b that are drawn out from a battery cell 111, and a circuit board 112 are connected to each other via tabs 114.

A lead with connector 115 for output is connected to the circuit board 112. The battery cell 111, the positive electrode lead 118a, the negative electrode lead 118b, and the circuit board 112 are fixed by attaching insulating tapes 116a to 116d at predetermined positions.

Further, the insulating tapes 116a to 116d are double-sided adhesive tapes, with which the battery pack is fixed to a predetermined position of the electronic apparatus main body. An exterior label 117 is attached to a predetermined position of the battery cell 111. On the exterior label 117, a rating of the battery cell 111 and the like are printed and displayed.

SUMMARY OF THE INVENTION

However, the battery pack shown in FIG. 14 has had the following problems. Because positioning of the circuit board 112 is difficult to be made when the circuit board 112 is fixed by the insulating tapes 116a to 116d, a drawn-out position of the lead with connector 115 connected to the circuit board 112 is varied.

Further, the battery pack shown in FIG. 14 does not include a guide member for mounted components that are mounted onto the circuit board 112 and thus the mounted components are exposed. Therefore, there is a fear that, when assembly is performed or a shock is received from the outside, the mounted components come into contact with the battery cell 111 and the battery cell 111 is damaged.

In addition, in the battery pack shown in FIG. 14, because the positive electrode lead 118a and negative electrode lead 118b are fixed by only the insulating tapes 116c and 116d, there is a fear that when a shock is received due to drop or the like, the leads may be deformed due to the shock.

Further, in the fixation by the insulating tapes 116a to 116d, deviation from predetermined attachment positions is liable to be caused at a time of attachment and therefore the battery cell 111 and the like are unstably fixed. For example, when the insulating tapes 116a to 116d are attached with deviation, there is a fear that a fixed position of the battery cell 111 or the like is deviated and an outer dimension of the battery pack is changed.

Furthermore, because the battery pack shown in FIG. 14 causes a large change of the outer dimension due to expansion of the battery, the battery pack is fixed to the electronic apparatus main body by using the insulating tapes 116a to 116d serving as the double-sided adhesive tapes. As a result, it is difficult to detach the battery pack when the battery cell 111 is exchanged for another one and on other occasions.

Moreover, in the battery pack shown in FIG. 14, the insulating tapes 116a to 116d are merely attached to outer surfaces of the battery cell 111. Therefore, the outer dimension of the battery pack is liable to be affected by the expansion of the battery cell 111.

Further, the insulating tapes 116a to 116d are manually attached and thus the attachment positions thereof are varied. In addition, it is also necessary to attach the plurality of insulating tapes 116a to 116d. Therefore, productivity becomes low.

Accordingly, there is a need for a battery pack capable of reducing the number of components such as an insulating tape for fixing a battery cell, fixing the components stably with less change of an outer dimension, and arranging the components with high positional accuracy.

According to an embodiment of the present invention, there is provided a battery pack including: a battery cell including a battery device covered with a laminate film; a circuit board connected to the battery cell; and a holder including a cell holder that covers the battery cell and a circuit board holder that covers the circuit board. In the battery pack, the circuit board holder covering the circuit board is arranged in a space formed above a terrace portion of the battery cell covered with the cell holder.

According to the embodiment of the present invention, the battery pack includes the battery cell, the circuit board, and the holder that includes the cell holder and the circuit board holder, and has a structure in which the circuit board holder covering the circuit board is arranged in the space formed above the terrace portion of the battery cell covered with the cell holder. With this structure, it is possible to reduce the number of components such as an insulating tape for fixing the battery cell, fix the components stably with less change of an outer dimension, and arrange the components with high positional accuracy.

According to the embodiment of the present invention, the number of components such as an insulating tape for fixing a battery cell can be reduced, the components can be fixed stably with less change of an outer dimension, and the components can be arranged with high positional accuracy.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings. The embodiments described below are specific examples of the present invention, and various limitations technically desirable are imparted thereto. However, in the following description, the range of the present invention is not limited to the embodiments as long as there is no particular description to limit the present invention. It should be noted that description will be given in the following order.
1. First embodiment (First example of battery pack)
2. Second embodiment (Second example of battery pack)
3. Other embodiments (modified examples)

1. First Embodiment

Structure of Battery Pack

Figure 1:
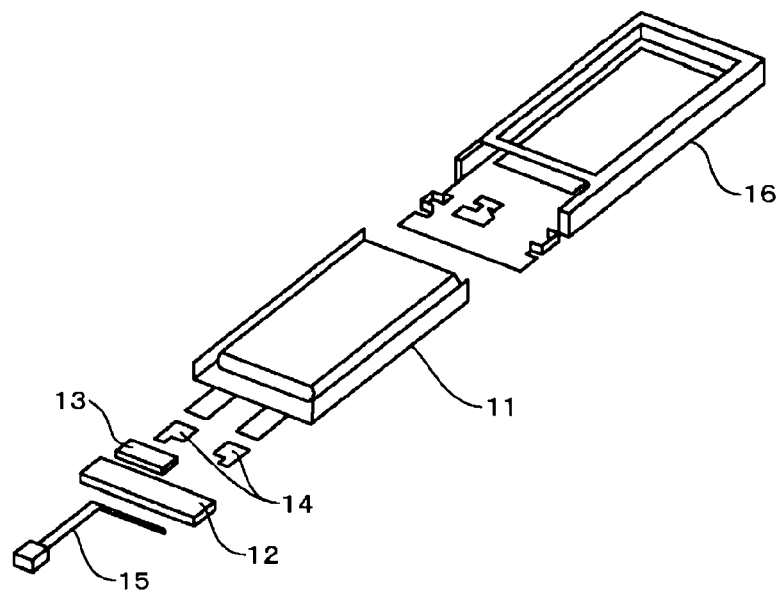
FIG. 1 is an exploded perspective view showing a structure of a battery pack according to a first embodiment of the present invention.
Figure 2:
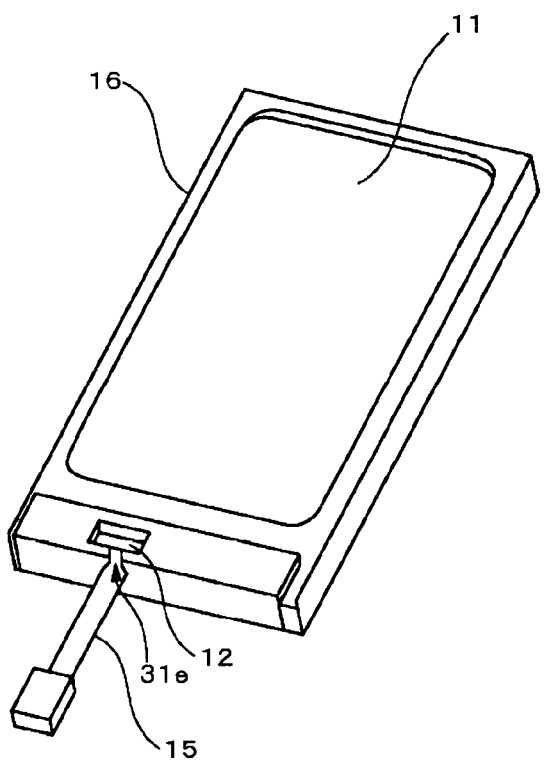
FIG. 2 is a perspective view showing an appearance of the battery pack according to the first embodiment of the present invention.

With reference to FIGS. 1 and 2, a structure of a battery pack according to a first embodiment of the present invention will be described. FIG. 1 is an exploded perspective view showing the structure of the battery pack according to the first embodiment of the present invention. FIG. 2 is a perspective view showing an appearance of the battery pack according to the first embodiment of the present invention.

As shown in FIG. 1, the battery pack according to the first embodiment of the present invention includes a battery cell 11, a circuit board 12, a safety protection device 13, tabs 14, a lead with connector 15 connected to the circuit board 12, and a holder 16.

The battery cell 11 and the circuit board 12 are connected to each other via the safety protection device 13 and/or the tabs 14, and the lead with connector 15 is connected to the circuit board 12. A component in which the battery cell 11, the circuit board 12, the lead with connector 15, and the like are connected and integrated is covered with the holder 16, which constitutes a battery pack whose appearance is shown in FIG. 2. It should be noted that for convenience, the component obtained by connecting and integrating the battery cell 11, the circuit board 12, the lead with connector 15, and the like will be hereinafter referred to as cell assy.

As shown in FIG. 2, the cell assy is covered with the holder 16 in the battery pack. In a state where the cell assy is covered with the holder 16, an upper surface and a lower surface of the battery cell 11 are partially exposed. This battery pack is a battery pack of a soft pack type that is incorporated into an electronic apparatus or the like at a predetermined position thereof.

On a front side of the holder 16, the lead with connector 15, which is a conductive member to be connected to an electronic apparatus, is extended. The lead with connector 15 is inserted into a hole 31e provided to the holder 16. The hole 31e is provided so as to highly accurately define an drawn-out position of the lead with connector 15.

Further, on the front side of the holder 16, components such as the circuit board 12 connected to the lead with connector 15 and the safety protection device 13 connected to the circuit board 12 are fixed in a state of being covered with the holder 16. Though described in detail later, the circuit board 12 is accommodated in a circuit board holder of the holder 16 and is disposed on the front side of the holder 16 while being covered with the circuit board holder.

Hereinafter, the structure of the battery pack will be described in detail.

(Battery Cell)

As shown in FIG. 3, the battery cell 11 includes a battery device 20, a laminate film 22 for covering the battery device 20, and a positive electrode lead 25a and a negative electrode lead 25b that are connected to the battery device 20.

Figure 3A:
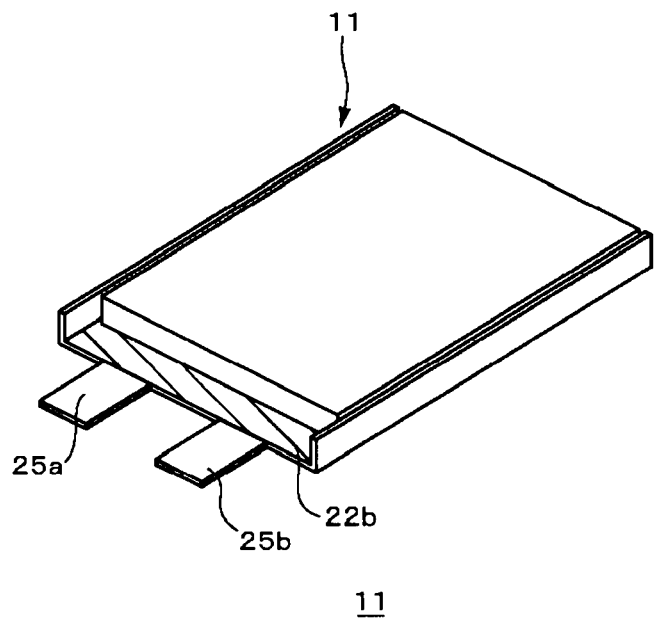
FIG. 3 are perspective views showing a structure of a battery cell.
Figure 3B:
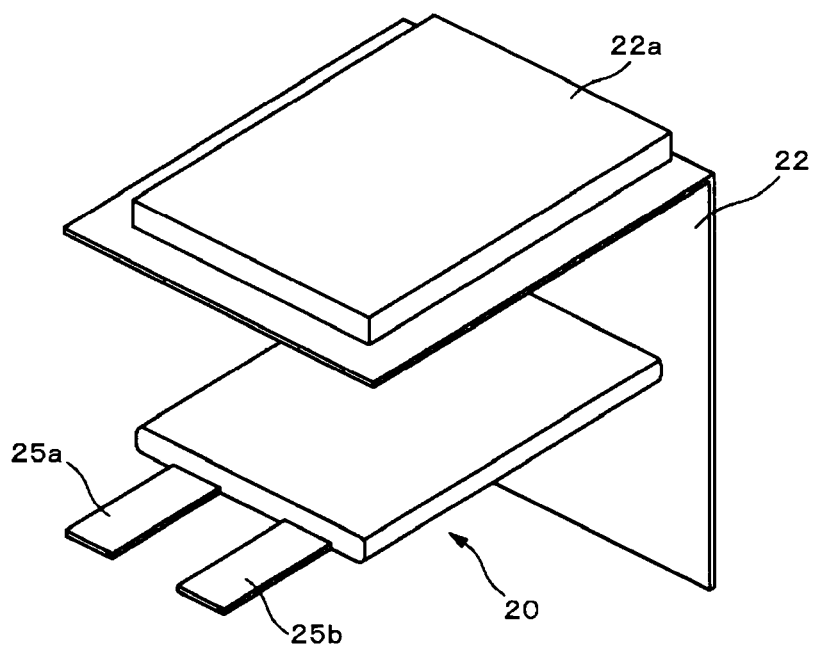

As shown in FIG. 3B, after the battery device 20 is accommodated in an accommodation portion 22a provided to the laminate film 22, three sides of the laminate film 22 except a folded-back side are sealed by thermal fusion or the like and thus the battery cell 11 having the appearance shown in FIG. 3A is obtained.

It should be noted that the battery cell 11 refers to a battery cell in which the battery device 20 is accommodated within the laminate film 22 and is not connected to the circuit board 12. Further, a portion at which the laminate film 22 is sealed via the positive electrode lead 25a and the negative electrode lead 25b, which is indicated by diagonal lines of FIG. 3A, is referred to as a terrace portion 22b.

(Battery Device)

The battery device 20 has a rectangular shape or a flat shape, for example, and a structure in which a strip positive electrode and a strip negative electrode are laminated via a polymer electrolyte and a separator and are wound in a longitudinal direction. The positive electrode and the negative electrode are connected with the positive electrode lead 25a and the negative electrode lead 25b, respectively.

The positive electrode includes a cathode active material layer formed on a strip cathode current collector and further includes a polymer electrolyte layer formed on the cathode active material layer. Moreover, the negative electrode includes an anode active material layer formed on a strip anode current collector and further includes a polymer electrolyte layer formed on the anode active material layer. The positive electrode lead 25a and the negative electrode lead 25b are connected to the cathode current collector and the anode current collector, respectively. As a cathode active material, an anode active material, and a polymer electrolyte, materials that have already been proposed may be used.

In the positive electrode, metal oxides, metal sulfides, or specific polymers may be used as the cathode active material in accordance with types of a target battery. For example, in a case where a lithium-ion battery is constituted, a lithium composite oxide or the like that is mainly formed of $Li_xMO_2$ (where M represents one or more kinds of transition metals, and X is changed depending on a charged/discharged state of a battery and is normally in a range from 0.05 or more to 1.10 or less) may be used as the cathode active material. Cobalt (Co), nickel (Ni), manganese (Mn), or the like is desirable as the transition metal M constituting the lithium composite oxide.

Specific examples of the lithium composite oxide as described above include $LiCoO_2$, $LiNiO_2$, $LiNi_yCo_{1-y}O_2$ (where $0<y<1$), and $LiMn_2O_4$. Those lithium composite oxides can generate a high voltage and are excellent in energy density. Further, metal sulfides or oxides containing no lithium such as $TiS_2$, $MoS_2$, $NbSe_2$, and $V_2O_5$ may be used as the cathode active material. A plurality of kinds of those cathode active materials may be used in combination for the positive electrode. Furthermore, when the positive electrode is formed using the cathode active materials as described above, a conductor, a binder, and the like may be added.

As the negative electrode material, materials capable of doping or dedoping lithium can be used. For example, carbon materials such as a hardly-graphitizable carbon material and a graphite material can be used. More specifically, examples of the carbon materials include pyrolytic carbons, cokes (pitch coke, needle coke, petroleum coke), graphites, glassy carbons, organic polymer compound sinters (phenol resin, furan resin, or others sintered at proper temperature and carbonized), carbon fiber, and active carbons. Further, examples of the materials capable of doping or dedoping lithium include polymers such as polyacetylene and polypyrrole, and oxides such as $SnO_2$. When the negative electrode is formed of those materials, a binder and the like may be added.

The polymer electrolyte is formed by adding a gel-like electrolyte to a polymer, the gel-like electrolyte being formed by mixing a polymer material, an electrolytic solution, and an electrolyte salt. The polymer material is compatible with the electrolytic solution. As the polymer material, silicon gel, acrylic gel, acrylonitrile gel, polyphosphazene-modified polymers, polyethylene oxides, polypropylene oxides, their composite polymers, cross-linked polymers, and modified polymers, and fluorine-containing polymers such as poly(vinylidene fluoride), poly(vinylidene fluoride-co-hexafluoropropylene), and poly(vinylidene fluoride-co-trifluoroethylene), and their mixture are used.

Components of the electrolytic solution can disperse the polymer materials described above, and ethylene carbonate (EC), propylene carbonate (PC), butylene carbonate (BC), or the like is used as an aprotic solvent, for example. For the electrolyte salt, a material compatible with the solvent is used and contains a cation and an anion in combination. For the cation, alkali metal or alkali earth metal is used. For the anion, $Cl^-$, $Br^-$, $I^-$, $SCN^-$, $ClO_4^-$, $BF_4^-$, $PF_6^-$, $CF_3SO_3^-$, and the like are used. Specifically, lithium hexafluorophosphate or lithium tetrafluoroborate is used for the electrolyte salt at a concentration soluble to the electrolytic solution.

(Laminate Film)

Figure 4:
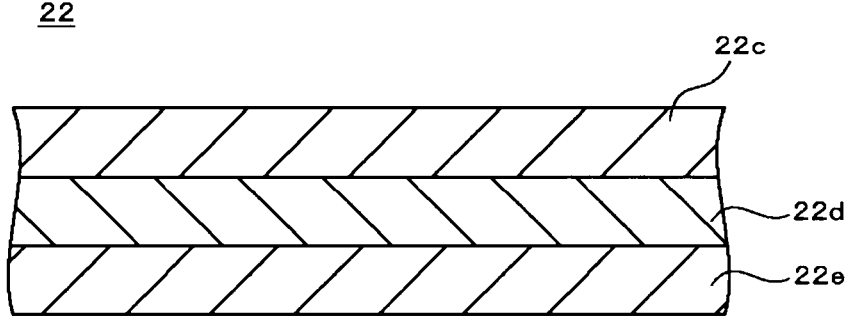
FIG. 4 is a cross-sectional view showing a structure of a laminate film.

The laminate film 22 has a laminated structure having moisture-proof property and insulation property, in which a bonding layer 22c, a metal layer 22d, and a surface protective layer 22e are sequentially laminated, for example, as shown in FIG. 4. It should be noted that though described in (3. Other embodiments), the structure of the laminate film 22 is not limited to the above structure.

The bonding layer 22c has a function of preventing change of properties of the polymer electrolyte and serves as a portion to be melted and fused by heat or ultrasonic wave. Usable examples of the bonding layer 22c include polyethylene (PE), cast polypropylene (CPP), polyethylene terephthalate (PET), nylon (Ny), low density polyethylene (LDPE), high density polyethylene (HDPE), and linear low density polyethylene (LLDPE), and some kinds of them can be selected for use. A thickness of the bonding layer 22c is, for example, about 30 μm.

For the metal layer 22d, a soft metal material is used. The metal layer 22d plays a roll of preventing moisture, oxygen, and light from penetrating and protecting the contents therefrom, in addition to enhancing strength of an exterior member. As the soft metal material, aluminum is most suitable from the viewpoint of lightness, stretchability, costs, and easy workability. In particular, aluminum such as 8021O and 8079O based on the JIS standard is desirably used.

The surface protective layer 22e has a function of protecting a surface. A polyolefin resin, a polyamide resin, a polyimide resin, polyester, and the like are used from the viewpoint of achieving excellent appearance, toughness, and flexibility. Specifically, nylon (Ny), polyethylene terephthalate (PET), polyethylene naphthalate (PEN), polybutylene terephthalate (PBT), or polybutylene naphthalate (PBN) is used, and some kinds of them can be selected for use.

(Circuit Board)

Mounted onto the circuit board 12 are a protection circuit including a charge and discharge control FET (Field Effect Transistor) and an IC (Integrate Circuit) for monitoring the battery cell 11 and controlling the charge and discharge control FET, an ID resistor for identifying the battery pack, a connector for connection with the outside, and the like.

The protection circuit including the charge and discharge control FET and the IC for controlling the charge and discharge control FET monitors a voltage of the battery cell 11, turns off the charge and discharge control FET when the voltage exceeds 4.3 V to 4.4 V, to thereby prohibit further charge. Further, when over-discharge is performed until a terminal voltage of the battery cell 11 is decreased to or less than a discharge prohibiting voltage and falls below the discharge prohibiting voltage, the protection circuit turns off the discharge control FET and prohibits discharge.

(Safety Protection Device)

The safety protection device 13 is a component for shutting down a current circuit of the battery cell 11 when a temperature of the battery cell 11 becomes high and preventing thermal runaway of the battery cell 11. Examples of the safety protection device 13 include a PTC element, a fuse, and a thermistor. The PTC element is connected to the battery cell 11 in series and when the temperature of the battery cell 11 becomes higher than a set temperature, electric resistance is abruptly increased and the PTC element substantially cuts off a current flowing to the battery cell 11. The fuse or thermistor is also connected to a battery device in series and cuts off a current flowing to the battery cell 11 when the temperature of the battery cell 11 becomes higher than the set temperature.

(Holder)

Figure 5:
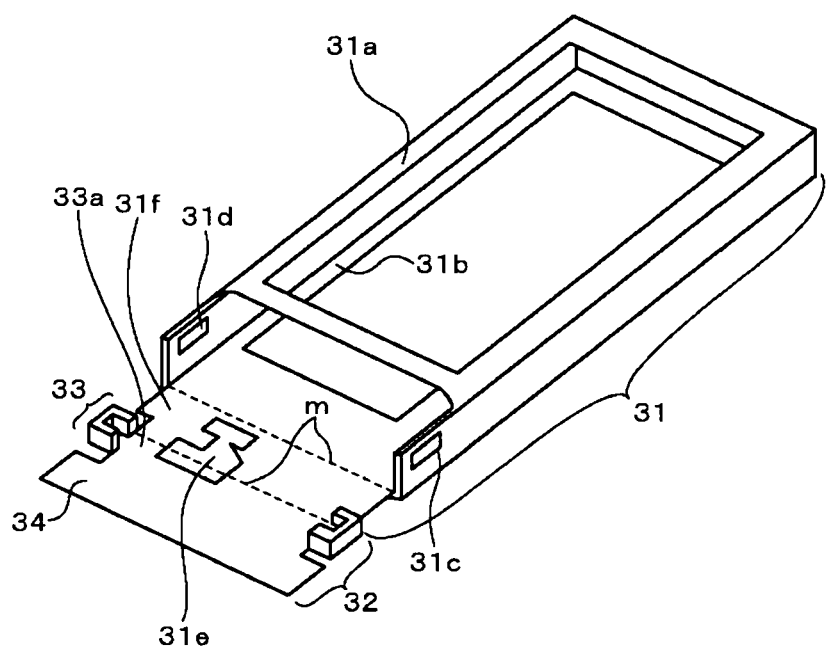
FIG. 5 is a perspective view showing a structure of a holder of the battery pack according to the first embodiment of the present invention.

The holder 16 is an exterior member for fixing and holding the cell assy by covering it. As shown in FIG. 5, the holder 16 includes a cell holder 31 for fixing and holding the battery cell 11 and a circuit board holder 32 for fixing and holding the circuit board 12. Further, the circuit board holder 32 includes a circuit board placement portion 33 on which the circuit board 12 is placed and accommodated and a holder cover 34 that is fitted to the circuit board placement portion 33 from above. The cell holder 31 and the circuit board holder 32 are integrally molded to be a resin molded article.

Examples of the resin material constituting the holder 16 include polypropylene (PP), an acrylonitrile-butadiene-styrene copolymer resin (ABS), polyamide (PA), polycarbonate (PC), polybutylene terephthalate (PBT), and polyphenylene sulfide (PPS). Of those, polycarbonate (PC) and an acrylonitrile-butadiene-styrene copolymer resin (ABS) are desirable from the viewpoint of flame retardancy and shock resistance.

(Cell Holder)

The cell holder 31 has a space defined by an upper surface, a lower surface, and three side surfaces thereof, in which the battery cell 11 can be accommodated. The upper surface of the cell holder 31 is a rectangle having substantially the same shape and area as those of an upper surface of the accommodation portion 22a of the battery cell 11 shown in FIG. 3, for example, from which a smaller and similar rectangle thereof is cut out, to thereby form a frame-shaped surface 31a.

Further, the lower surface of the cell holder 31 is a rectangle having substantially the same shape and area as those of the lower surface of the battery cell 11, for example, from which a smaller and similar rectangle of the rectangle as the upper surface of the accommodation portion 22a of the battery cell 11 is cut out, to thereby form a frame-shaped surface 31b.

Moreover, a portion surrounded by dotted lines m on the lower surface of the cell holder 31 is a lead arrangement portion 31f above which the positive electrode lead 25a and the negative electrode lead 25b are arranged. The hole 31e for positioning the lead with connector 15 described above is provided over the lead arrangement portion 31f and a bottom surface 33a of the circuit board holder 32.

In a state where the battery cell 11 is accommodated in the cell holder 31, the frame-shaped surface 31a as the upper surface of the cell holder 31 is arranged at a position opposed to edge sides of the upper surface of the accommodation portion 22a of the battery cell 11 and covers the edge sides of the upper surface of the accommodation portion 22a of the battery cell 11.

Further, in the state where the battery cell 11 is accommodated in the cell holder 31, the frame-shaped surface 31b of the cell holder 31 is arranged at a position opposed to a circumference of the lower surface of the battery cell 11 and an outer surface of the terrace portion 22b, and covers the circumference of the lower surface of the battery cell 11 and the outer surface of the terrace portion 22b.

Furthermore, in the state where the battery cell 11 is accommodated in the cell holder 31, the three side surfaces of the cell holder 31 are arranged at positions opposed to three side surfaces of the battery cell 11 and cover the three side surfaces of the battery cell 11.

It should be noted that dimensions of the respective portions of the cell holder 31 are selected as follows. A length of the two side surfaces of the cell holder 31 in a longitudinal direction is set to be substantially the same as a length of the two side surfaces of the battery cell 11 in the longitudinal direction. Further, a length of the side surface of the cell holder 31 in a short side direction is set to be substantially the same as a length of the side surface of the battery cell 11 in the short side direction.

An interval between the frame-shaped surface 31a and the frame-shaped surface 31b of the cell holder 31 is set to be substantially the same as a thickness of the battery cell 11. A width of the lead arrangement portion 31f in the short side direction is set to be substantially the same as a length of the positive electrode lead 25a and the negative electrode lead 25b in an extending direction. By selecting such dimensions, the battery cell 11 is covered with the cell holder 31 in a state where the battery cell 11 fits the cell holder 31.

At predetermined positions on the two side surfaces of the cell holder 31 in the longitudinal direction, holes 31c and 31d that are engaged with protrusions provided to the circuit board holder 32 described later are provided. Though described later in detail, the holes 31c and 31d fix a bent state of the circuit board holder 32 by a snap-fit structure. It should be noted that the snap-fit structure refers to a structure in which a protrusion or the like is provided to one component and a hole or the like is provided to the other component, and the component and the other component are fixed and held by the protrusion and the hole being engaged with each other.

(Circuit Board Holder)

The circuit board holder 32 includes the circuit board placement portion 33 to which the circuit board 12 is inserted, and the holder cover 34 that is fitted to the circuit board placement portion 33 from above.

(Circuit Board Placement Portion)

Figure 6A:
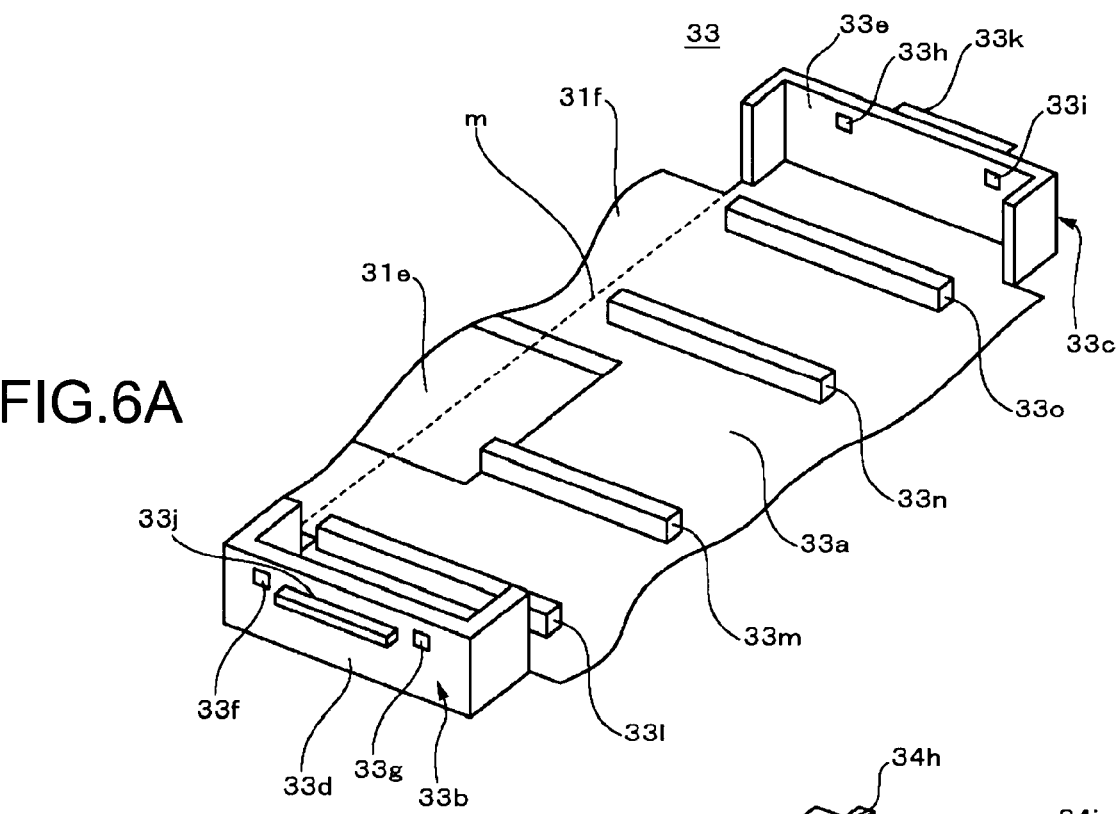
FIG. 6 are perspective views showing a structure of a circuit board placement portion and a holder cover.

The circuit board placement portion 33 is a member to which the circuit board 12 is inserted. As shown in FIG. 6A, the circuit board placement portion 33 includes the bottom surface 33a and wall portions 33b and 33c that upwardly protrude from both end portions of the bottom surface 33a and have a U-shape in cross section. The circuit board 12 is inserted into a space defined by the bottom surface 33a and the wall portions 33b and 33c so that a main surface of the circuit board 12 is opposed to the bottom surface 33a.

Further, the hole 31e into which the lead with connector 15 is inserted is provided on the bottom surface 33a of the circuit board placement portion 33. It should be noted that the hole 31e is provided over the lead arrangement portion 31f and the bottom surface 33a as described above.

A wall surface 33d provided along a short side direction of the circuit board placement portion 33 is provided with holes 33f and 33g that are respectively engaged with protrusions 34f and 34g of the holder cover 34. Further, a wall surface 33e provided along the short side direction of the circuit board placement portion 33 is provided with holes 33h and 33i that are respectively engaged with protrusions 34h and 34i of the holder cover 34.

In addition, the wall surface 33d and the wall surface 33e are provided with protrusions 33j and 33k that are engaged with the hole 31d and the hole 31c provided to the side surfaces of the cell holder 31, respectively, at the center of the wall surface 33d and the wall surface 33e.

A height of the wall portions 33b and 33c is set to be larger than the length of the circuit board 12 in a thickness direction. Further, in a state where the holder cover 34 and the circuit board placement portion 33 are fitted to each other, the outer surface of the holder cover 34 and the upper surfaces of the wall portions 33b and 33c constitute a flat surface.

Moreover, a plurality of ribs 33l to 33o that upwardly protrude from the bottom surface 33a are provided on the bottom surface 33a. The plurality of ribs 33l to 33o are provided along the short side direction of the bottom surface 33a. Each of intervals at which the plurality of ribs 33l to 33o are provided is set to be longer than a width of a mount portion of the circuit board 12 on which each mounted component is mounted, for example.

Specifically, the interval between the rib 33l and the rib 33m is set to be longer than a width of the mount portion of the circuit board 12 and the interval between the rib 33n and the rib 33o is set to be longer than the width of the mount portion of the circuit board 12.

(Holder Cover)

Figure 6B:
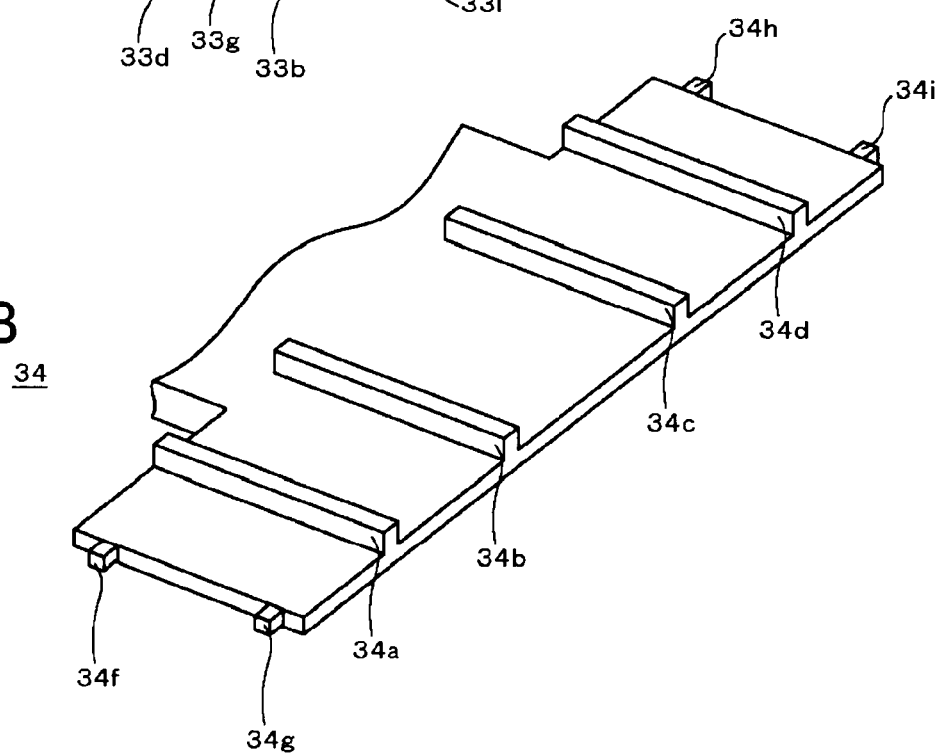

The holder cover 34 covers the circuit board 12 by being fitted to the circuit board placement portion 33 from above in a state where the circuit board 12 is inserted into the circuit board placement portion 33. As shown in FIG. 6B, a plurality of ribs 34a to 34d that upwardly protrude are provided on a surface of the holder cover 34, to which the circuit board 12 is opposed. The plurality of ribs 34a to 34d are provided along the short side direction of the holder cover 34. Further, the protrusions 34f to 34i that are engaged with the holes 33f to 33i of the circuit board placement portion 33, respectively, are provided on both side surfaces of the holder cover 34.

(Fit State of Holder Cover and Circuit Board Placement Portion)

Figure 7A:
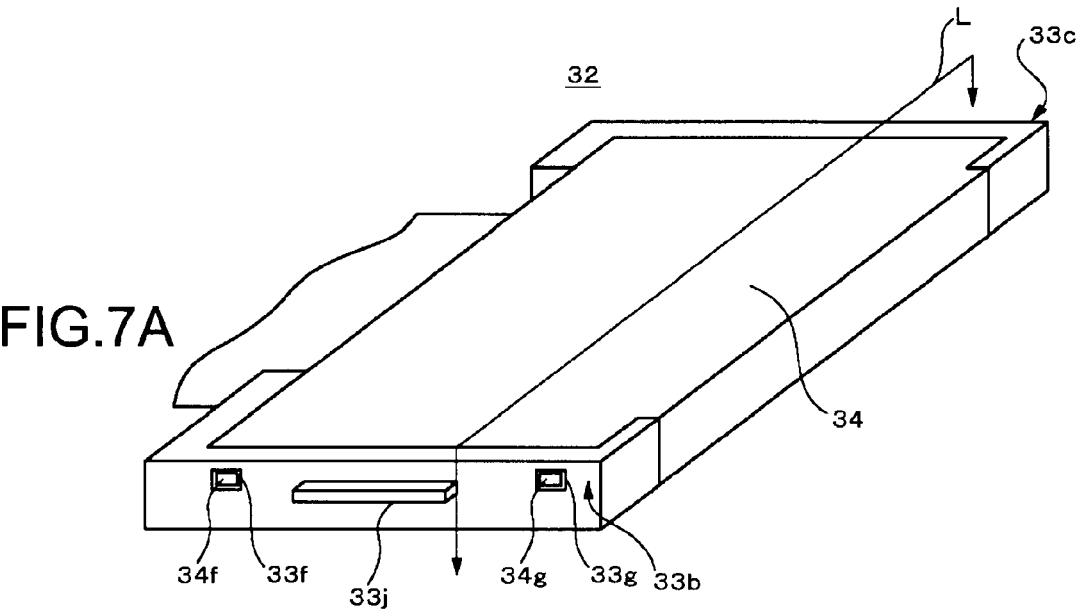
FIG. 7 are a perspective view and a cross-sectional view showing a state where the circuit board placement portion and the holder cover are fitted together.
Figure 7B:
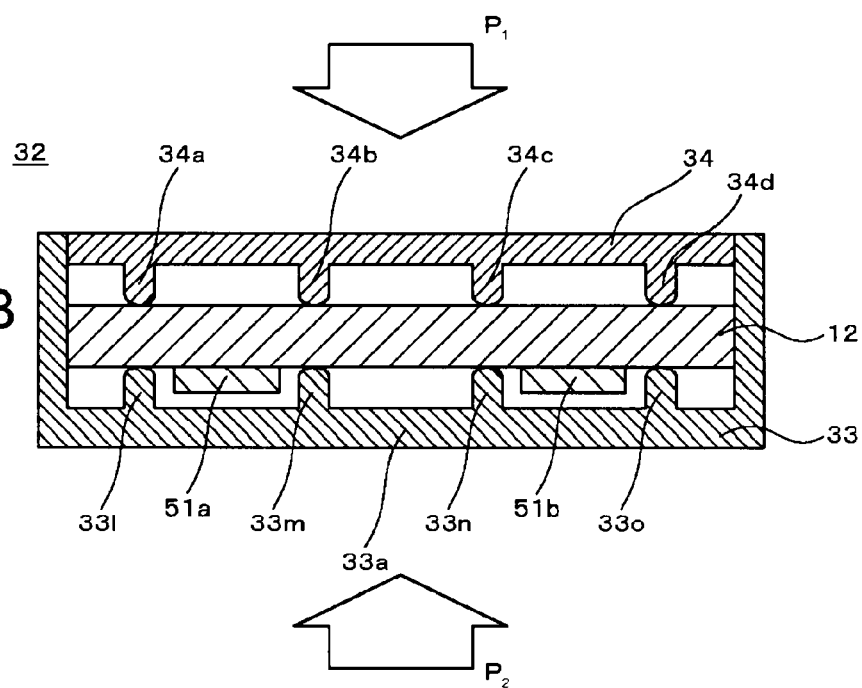

FIG. 7 show a state of the circuit board holder 32 in which the circuit board 12 is accommodated and the circuit board placement portion 33 and the holder cover 34 are fitted to each other. FIG. 7A is a perspective view showing a state of the circuit board holder 32 in which the circuit board 12 is accommodated and the circuit board placement portion 33 and the holder cover 34 are fitted to each other. FIG. 7B is a cross-sectional view taken along the line L of FIG. 7A.

As shown in FIG. 7A, in the state where the circuit board 12 is accommodated and the circuit board placement portion 33 and the holder cover 34 are fitted together, the holes 33f and 33g of the wall portion 33b are engaged with the protrusions 34f and 34g of the holder cover 34. Further, at positions not seen in FIG. 7A, the holes 33h and 33i of the wall portion 33c are engaged with the protrusions 34h and 34i of the holder cover 34. By such a snap-fit structure, the fit state of the circuit board placement portion 33 and the holder cover 34 is fixed and held.

Further, as shown in FIG. 7B, in the state where the circuit board 12 is accommodated and the circuit board placement portion 33 and the holder cover 34 are fitted together, tip end portions of the four ribs 34a to 34d of the holder cover 34 abut on a substrate surface of the circuit board 12. Further, in the state where the circuit board 12 is accommodated and the circuit board placement portion 33 and the holder cover 34 are fitted together, tip end portions of the four ribs 33l to 33o provided to the bottom surface 33a of the circuit board placement portion 33 abut on a substrate surface of the circuit board 12.

As described above, by providing the structure in which the tip end portions of the ribs 34a to 34d and the ribs 33l to 33o abut on the substrate surfaces of the circuit board 12, the ribs function as a shock absorbing member for the circuit board 12.

Mount portions 51a and 51b of the circuit board 12 at which the mounted components are mounted are arranged on a side opposed to the circuit board placement portion 33. The mount portions 51a and 51b of the circuit board 12 are arranged in spaces formed by adjacent ribs out of the plurality of ribs 33l to 33o arranged in the width direction.

More specifically, the mount portion 51a is arranged in a space formed by the rib 33l and 33m that are adjacent to each other in the width direction. Further, the mount portion 51b is arranged in a space formed by the rib 33n and 33o that are adjacent to each other in the width direction.

A length of the ribs 33l to 33o in the protruding direction is set to be larger than a length of the mount portions 51a and 51b in the protruding direction with a surface of the circuit board 12 on which the mounted components are not mounted as a reference.

With this structure, in a state where the circuit board 12 is inserted, the mounted components are arranged in spaces in which the mounted components are not brought into contact with the bottom surface 33a of the circuit board placement portion 33 even when a pressure is applied in vertical direction from above and below as indicated by the arrows P1 and P2, for example. Accordingly, the mounted components can be protected in an assembly process of a battery pack or when a stress applied to the substrate from the outside is generated.

(Method of Producing Battery Pack)

A method of producing a battery pack according to the first embodiment will be described.

(Process of Producing Battery Device)

For example, a positive electrode and a negative electrode that each include gel electrolyte layers on both surfaces and separators are first laminated in an order of the negative electrode, the separator, the positive electrode, and the separator. Then, the obtained laminated body is wound around a core of a flat plate and wound many times in a longitudinal direction, to thereby produce a wound-type battery device 20.

(Process of Producing Battery Cell)

After the battery device 20 is accommodated in the accommodation portion 22a provided to the laminate film 22, the laminate film 22 is folded back so as to cover an opening of the accommodation portion 22a. After that, three sides except the folded-back side are sealed by thermal fusion or the like and thus a battery cell 11 is produced.

(Process of Connecting Lead and the Like)

The positive electrode lead 25a and negative electrode lead 25b of the battery cell 11 are connected to the circuit board 12 via the tabs 14 and/or the safety protection device 13. Further, the lead with connector 15 is connected to the circuit board 12 at a predetermined position. With this structure, the battery cell 11 and components including the circuit board 12 are connected and integrated, to thereby obtain a cell assy. It should be noted that the respective components are connected to each other by thermal fusion or ultrasonic welding, for example.

(Process of Incorporating Cell Assy)

Next, the cell assy is incorporated into the holder 16. Regarding the process of incorporating the cell assy, a simple flow of the process of incorporating the cell assy is described with reference to FIGS. 8A to 8C, and then a more detailed flow thereof is described with reference to FIGS. 9 and 10.

Figure 8A:
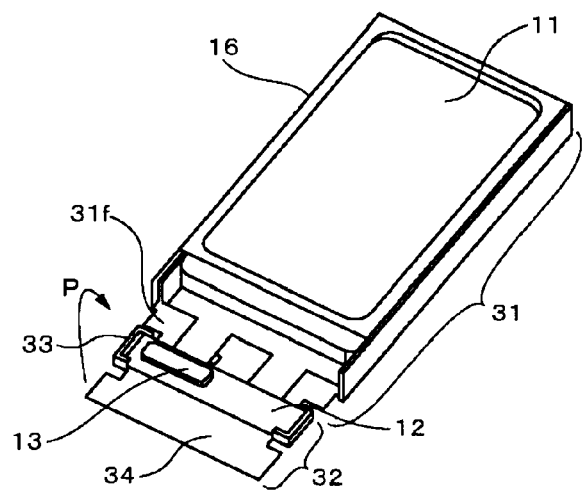
FIG. 8 are perspective views for explaining a manufacturing process of the battery pack according to the first embodiment of the present invention.

First, as shown in FIG. 8A, the battery cell 11 is accommodated in the cell holder 31 and the circuit board 12 is placed on the circuit board placement portion 33 of the circuit board holder 32. Next, as shown in FIG. 8B, the holder cover 34 in the state shown in FIG. 8A is bent as indicated by the arrow P and accordingly the holder cover 34 is fitted to the circuit board placement portion 33 from above the circuit board placement portion 33.

In this case, as described above, the protrusions 34f to 34i provided to the holder cover 34 are engaged with the holes 33f to 33i provided to the circuit board placement portion 33, respectively. By this snap-fit structure, the fit state of the circuit board placement portion 33 and holder cover 34 is fixed and held.

It should be noted that though described later, the holder cover 34 is provided with a hinge portion (not shown in FIG. 8) at a predetermined position, the hinge portion enabling the holder cover 34 to be bent smoothly and accurately.

Figure 8B:
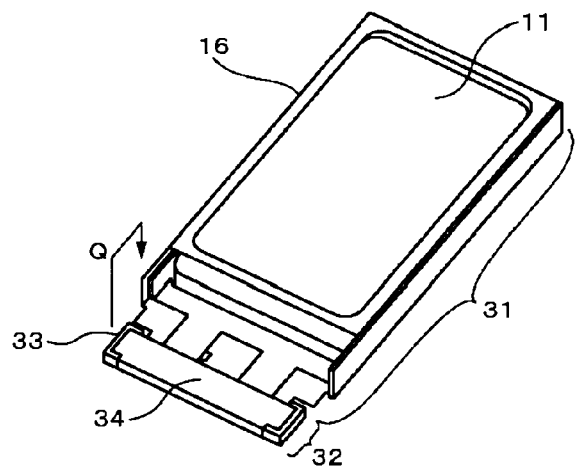
Figure 8C:
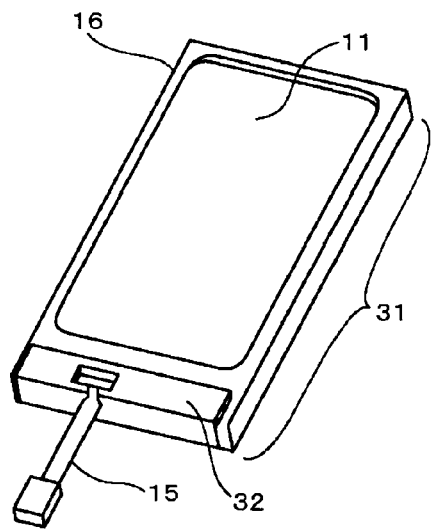

Next, as shown in FIG. 8C, by bending the circuit board holder 32 in the state shown in FIG. 8B as indicated by the arrow Q, the circuit board holder 32 in the state shown in FIG. 8B is arranged in a space at a front end portion of the cell holder 31.

The space formed at the front end portion of the cell holder 31 is a space above the terrace portion 22b of the battery cell 11. More specifically, the space formed at the end portion of the cell holder 31 is a space formed by a surface of the terrace portion 22b of the battery cell 11, an end surface of the accommodation portion 22a of the battery cell 11, and two side surfaces of the battery cell 11 in a state where the battery cell 11 is incorporated in the cell holder 31.

In this case, the protrusions 33j and 33k provided to the circuit board placement portion 33 and the holes 31c and 31d provided to the holder 16 are engaged with each other, and by the snap-fit structure, the arrangement state shown in FIG. 8C is fixed and held. As described above, the cell assy is incorporated into the holder 16 and thus the battery pack according to the first embodiment of the present invention is obtained.

(Details on Process of Incorporating Cell Assy)

Figure 9A:
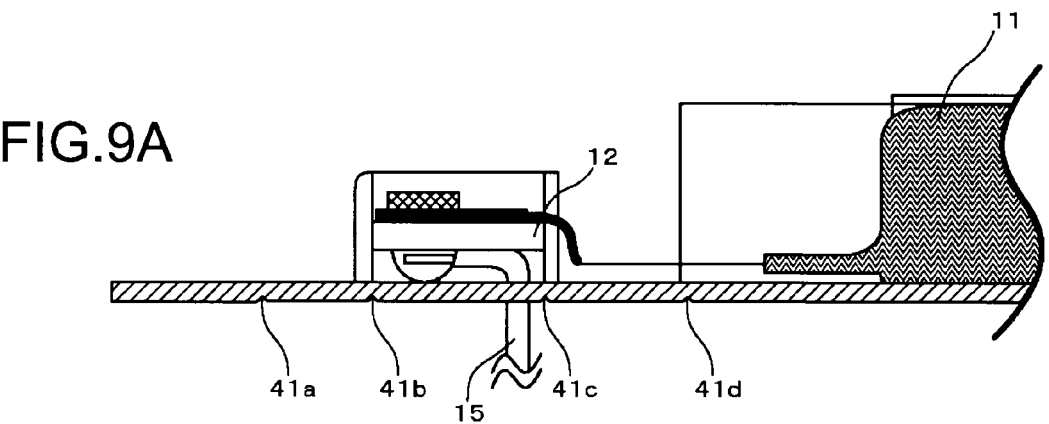
FIG. 9 are cross-sectional views for explaining the manufacturing process of the battery pack according to the first embodiment of the present invention.
Figure 9B:
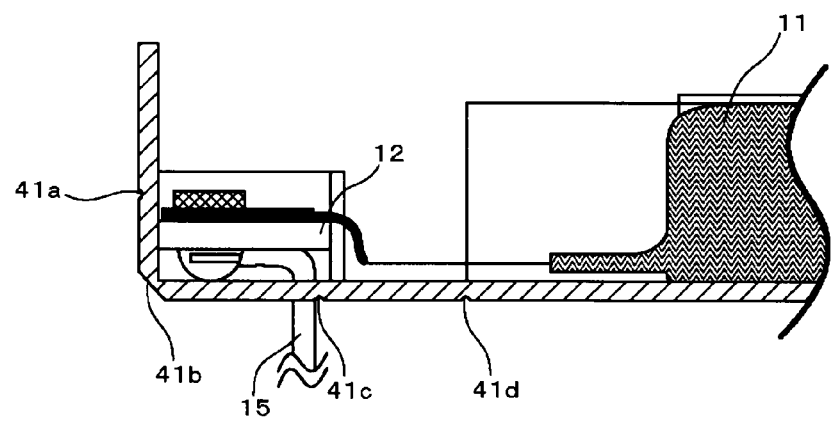
Figure 9C:
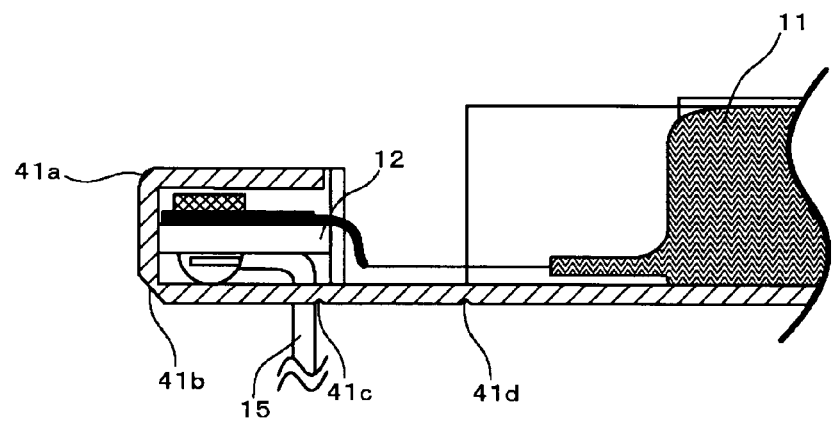
Figure 10A:
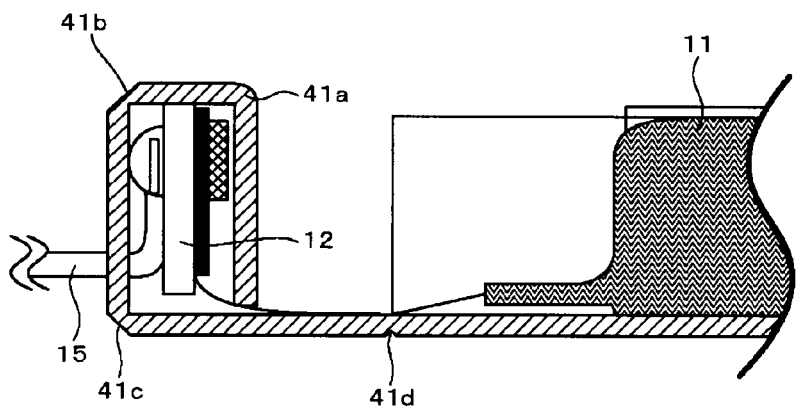
FIG. 10 are cross-sectional views for explaining the manufacturing process of the battery pack according to the first embodiment of the present invention.
Figure 10B:
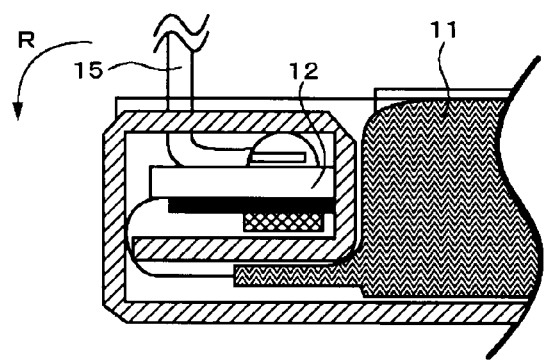
Figure 10C:
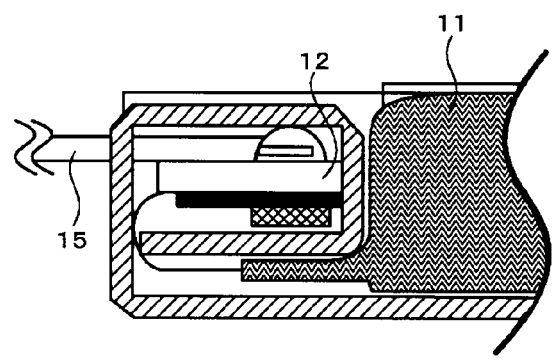

With reference to FIGS. 9 and 10, details on the process of incorporating the cell assy will be described. FIGS. 9A to 9C and 10A to 10C are cross-sectional views for explaining steps of the process of incorporating the cell assy.

It should be noted that the state of FIG. 9A corresponds to that of FIG. 8A. The state of FIG. 9C corresponds to that of FIG. 8B. The state of FIG. 10C corresponds to that of FIG. 8C. FIG. 9B shows a mid-state changing from the state shown in FIG. 9A to the state shown in FIG. 9C. FIGS. 10A and 10B show mid-states changing from the state shown in FIG. 9C to the state shown in FIG. 10C.

As shown in FIG. 9A, the holder 16 is provided with hinge portions 41a to 41d at positions corresponding to predetermined bent positions. It should be noted that hereinafter, the hinge portions 41a to 41d are referred to as a hinge portion 41 when collectively referred to.

Figure 11:
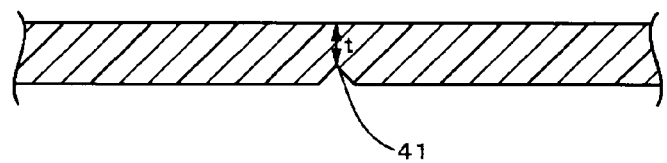
FIG. 11 is a cross-sectional view showing a structure of a hinge portion.

As shown in FIG. 11, the hinge portion 41 is a V-shaped groove in cross section that is provided along the width direction of the holder 16, and a thickness t from the bottom of the groove to an inner surface of the holder 16 is set to, for example, about 0.2 mm. The holder 16 can be bent smoothly and accurately with the hinge portion 41.

First, in the state shown in FIG. 9A, the hinge portion 41b is bent so that the state shown in FIG. 9B is obtained. Then, in the state shown in FIG. 9B, the hinge portion 41a is bent so that the state shown in FIG. 9C is obtained. The state shown in FIG. 9C corresponds to the state shown in FIG. 8B.

Next, in the state shown in FIG. 9C, the hinge portion 41c is bent so that the state shown in FIG. 10A is obtained. Then, in the state shown in FIG. 10A, the hinge portion 41d is bent so that the state shown in FIG. 10B is obtained. In the state shown in FIG. 10B, the lead with connector 15 that extends upwardly is bent to a direction shown by the arrow R, to thereby obtain the state shown in FIG. 10C. As described above, the cell assy is incorporated into the holder 16 and accordingly the battery pack according to the first embodiment of the present invention is obtained.

(Regarding Expansion of Cell and Accuracy on Outer Dimension)

Regarding accuracy on an outer dimension of the battery pack according to the first embodiment of the present invention, description will be given by comparing the structure of the battery pack and a structure of related art. FIG. 12 are cross-sectional views of the battery pack according to the first embodiment of the present invention. FIG. 13 are cross-sectional views of a battery pack in related art. It should be noted that FIG. 13 are cross-sectional views of the battery pack in related art that has been described with reference to FIG. 14.

With reference to FIG. 12, an outer dimension in the thickness direction of the battery pack according to the first embodiment of the present invention will be first described. It is generally known that a charge and discharge cycle of the battery cell 11 is repeated and thus the battery cell 11 is deteriorated and expanded.

Figure 12A:
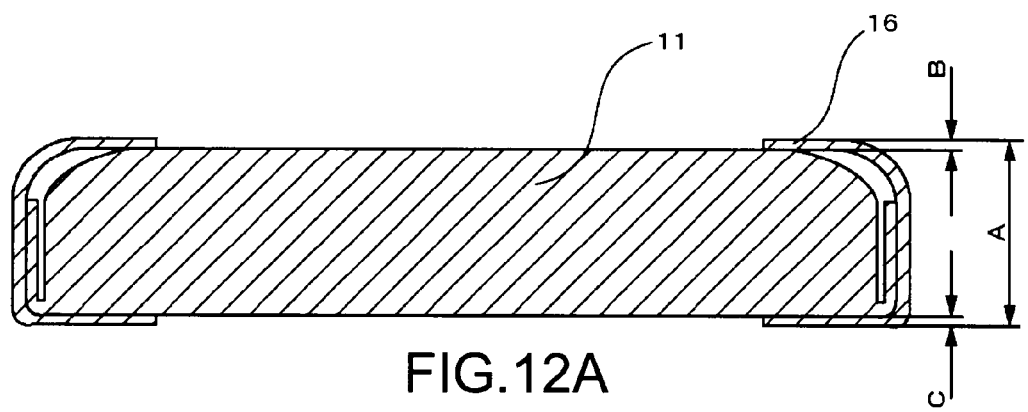
FIG. 12 are cross-sectional views for explaining an outer dimension of the battery pack according to the first embodiment of the present invention.
Figure 12B:
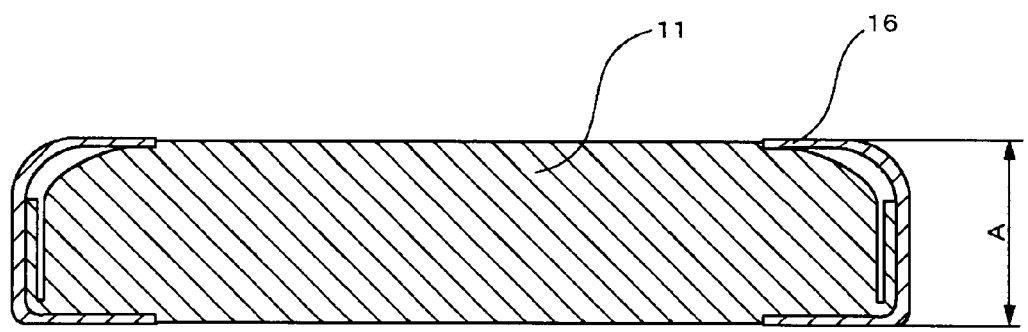

FIG. 12A shows a state where the battery cell 11 is not yet deteriorated and expansion thereof is not caused. FIG. 12B shows a state where the battery cell 11 is deteriorated and the expansion thereof is caused. It should be noted that the battery cell 11 shown in FIGS. 12A and 12B is in a fully charged state.

In the state shown in FIG. 12A, obtained before the battery cell 11 is deteriorated, an outer dimension A of the battery pack in the thickness direction corresponds to a dimension of the holder 16 in the thickness direction. On the outside shape of the battery pack, a clearance B that is substantially equal to a thickness of the holder 16 is present above the exposed surface of the battery cell 11. Further, on the outside shape of the battery pack, a clearance C that is substantially equal to the thickness of the holder 16 is present below the exposed surface of the battery cell 11.

In the state shown in FIG. 12B where the battery cell 11 is deteriorated, the battery cell 11 is expanded, but a thickness of the expansion of the battery cell 11 is in a range of the clearance B and the clearance C. Accordingly, the dimension A of the battery pack in the thickness direction is not changed even in the case where the battery cell 11 is expanded. In other words, the battery pack according to the first embodiment of the present invention keeps the outer dimension thereof even when the battery expansion is caused.

As described above, the battery pack according to the first embodiment of the present invention absorbs expansion of the battery cell 11 by the clearance B and clearance C that are present above and below the exposed portions of the battery cell 11 even when the battery cell 11 is deteriorated and thus expanded. Accordingly, there can be obtained an effect that the outer dimension of the battery pack is not changed even when the battery cell 11 is expanded.

Figure 13A:
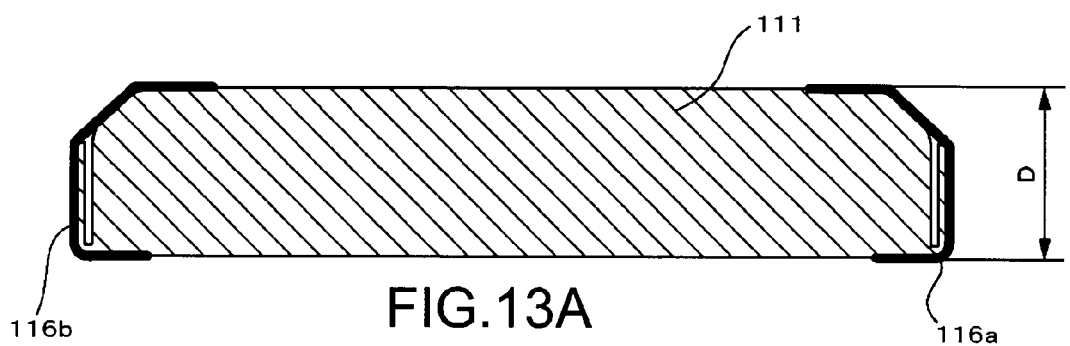
FIG. 13 are cross-sectional views for explaining an outer dimension of a battery pack in related art.
Figure 13B:
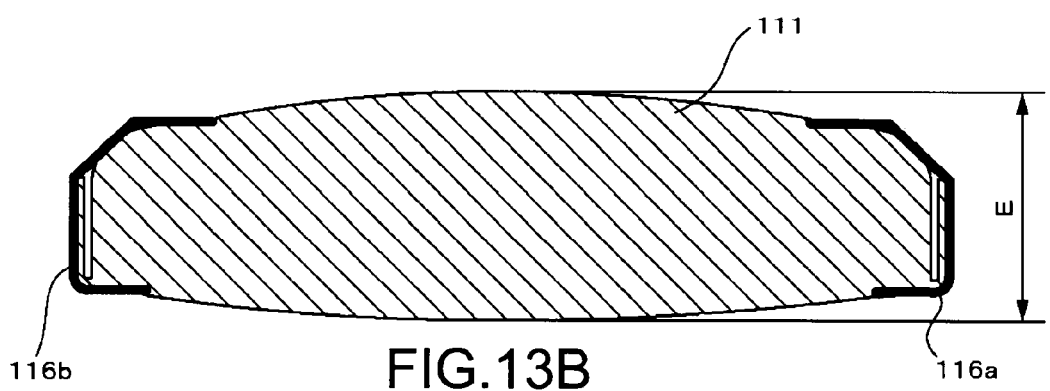

Next, with reference to FIG. 13, an outer dimension of the battery pack of related art in the thickness direction will be described. FIG. 13A shows a state where a battery cell 111 is not yet deteriorated and expansion thereof is not caused. FIG. 13B shows a state where the battery cell 111 is deteriorated and the expansion thereof is caused. It should be noted that the battery cell 111 shown in FIGS. 13A and 13B is in a fully charged state.

In the state shown in FIG. 13A, obtained before the battery cell 111 is deteriorated, an outer dimension D of the battery pack in the thickness direction corresponds to a dimension of insulating tapes 116a and 116b in a thickness direction. In the state shown in FIG. 13B where the battery cell 111 is deteriorated, the battery cell 111 is expanded and a thickness of exposed portions of the battery cell 111 exceeds the dimension of the insulating tapes 116a and 116b in the thickness direction. Accordingly, the thickness of the exposed portions of the battery cell 111 corresponds to a dimension E of the battery pack in the thickness direction. In other words, the outer dimension of the battery pack is not kept in the structure in related art when the battery expansion is caused.

(Effect of Battery Pack)

In the battery pack according to the first embodiment of the present invention, the circuit board 12 can be arranged at a predetermined position with high positional accuracy due to the circuit board holder 32 that is arranged above the terrace portion 22b of the battery cell 11. Further, the circuit board holder 32 is fixed to the cell holder 31 by the snap-fit structure, with the result that the arrangement of the circuit board 12 can be held stably.

In the battery pack according to the first embodiment of the present invention, the circuit board holder 32 is provided with the positioning hole 31e for defining an drawn-out position of the lead with connector 15. With this structure, the lead with connector 15 can be drawn out from a predetermined position with high positional accuracy. In addition, the circuit board holder 32 is fixed to the cell holder 31 by the snap-fit structure, with the result that the drawn-out position of the lead with connector 15 can be stably held.

In the battery pack according to the first embodiment of the present invention, the plurality of ribs 33l to 33o and 34a to 34d are provided within the circuit board holder 32. The plurality of ribs 33l to 33o and 34a to 34d function as a shock absorbing member for relieving a pressing force with respect to the circuit board 12, to thereby protect the circuit board 12.

Further, the mounted components mounted onto the circuit board are guided and accommodated in spaces defined by the plurality of ribs 33l to 33o and 34a to 34d of the circuit board holder 32. With this structure, the mounted components can be protected in the process of assembling the battery pack or when a stress to the circuit board 12 from the outside is generated.

Figure 14:
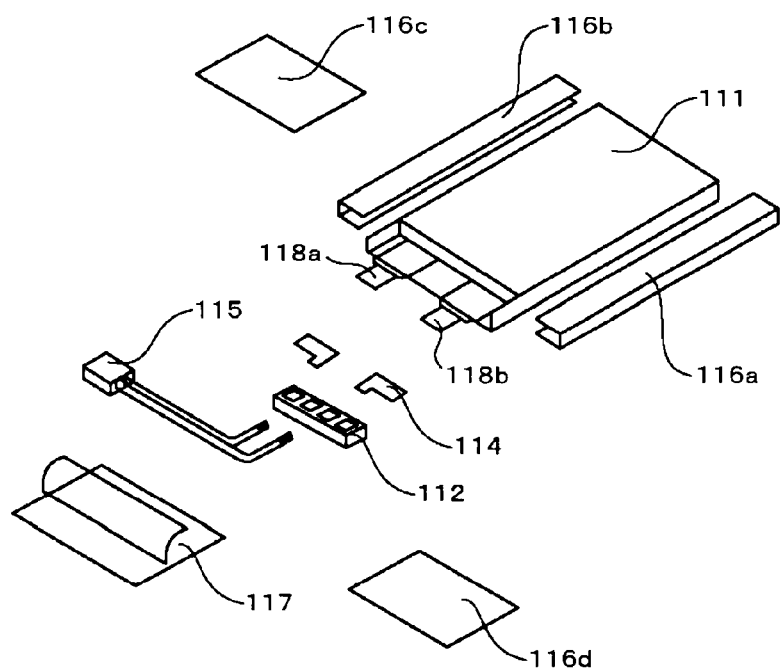
FIG. 14 is an exploded view showing a structure of the battery pack in related art.

Furthermore, in the battery pack according to the first embodiment of the present invention, an outer dimension with high accuracy is obtained by covering the battery cell 11 with the cell holder 31. Moreover, center portions of the upper and lower surfaces of the cell holder 31 are cut out and expanded portions of the battery cell 11 are not covered, which leads to an effect that the outer dimension of the battery pack is not changed even when the battery cell 11 is expanded. In addition, by using the holder 16, the components such as the insulating tapes 116a and 116b used in the battery pack in related art as shown in FIG. 14 can be omitted. Accordingly, the production process can be simplified and productivity can be increased.

2. Second Embodiment

A battery pack according to a second embodiment of the present invention will be described. The battery pack according to the second embodiment is different from that of the first embodiment in the structure of the battery cell, and other structures of the battery pack are the same as those of the first embodiment.

Further, a method of producing the battery pack according to the second embodiment of the present invention is also the same as that of the first embodiment of the present invention, except the method of producing the battery cell. Accordingly, a structure of a battery cell and a method of producing a battery cell will be described hereinafter, and detailed descriptions on other structures and the like are omitted because they are the same as those of the battery pack according to the first embodiment.

(Battery Cell)

A battery cell includes a battery device, a laminate film for covering the battery device, and an electrolytic solution that is injected within the laminate film and in which the battery device is immersed. The laminate film has the same structure as in the first embodiment, for example. The battery device has a rectangular shape or a flat shape and a structure in which a strip positive electrode and a strip negative electrode are laminated via a separator and are wound in a longitudinal direction.

The electrolytic solution is constituted of an aprotic solvent and an electrolyte salt dissolved in the aprotic solvent. As the aprotic solvent, ethylene carbonate (EC), propylene carbonate (PC), butylene carbonate (BC), or the like is used, for example. For the electrolyte salt, a material compatible with the solvent is used and contains a cation and an anion in combination. For the cation, alkali metal or alkali earth metal is used. For the anion, $Cl^-$, $Br^-$, $I^-$, $SCN^-$, $ClO_4^-$, $BF_4^-$, $PF_6^-$, $CF_3SO_3^-$, and the like are used. Specifically, lithium hexafluorophosphate or lithium tetrafluoroborate is used for the electrolyte salt at a concentration soluble to the electrolytic solution.

This battery cell is obtained as follows. First, after the battery device is accommodated on the laminate film, an outer circumferential portion of the laminate film except one side is thermally fused and the laminate film is formed into a sac-like shape. After that, the electrolytic solution is injected from an opening portion that has not been thermally fused and the battery device is immersed in the electrolytic solution. Then, by sealing the opening portion of the laminate film by thermal fusion, the battery cell is obtained.

(Effect of Battery Pack)

The battery pack according to the second embodiment can produce the same effect as that of the battery pack according to the first embodiment.

3. Other Embodiments

The present invention is not limited to the embodiments described above, and various modifications and applications can be made without departing from the gist of the present invention. For example, a structure of a battery device is not limited to that of the battery device according to the first embodiment or the second embodiment. For example, a laminated body in which a positive electrode, a polymer electrolyte, and/or a separator, and a negative electrode are laminated may be used as a battery device.

Further, the shape of the battery cell 11 is not limited to the shape of the battery pack according to the first embodiment or the second embodiment. Moreover, instead of the structure of the laminate film 22 described above, a laminate film having another structure may be used. For example, the laminate film 22 may be constituted of a polymer film made of polypropylene or the like, or a metal film.

The present application contains subject matter related to that disclosed in Japanese Priority Patent Application JP 2009-026871 filed in the Japan Patent Office on Feb. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack, comprising:
a battery cell which includes a battery device covered with a laminate film, the laminate film provides a terrace portion where the battery device is connected to a positive electrode lead and a negative electrode lead;
a circuit board configured to be connected to the battery cell; and
a holder, which comprises:
a cell holder configured to cover the battery cell, and
a circuit board holder configured to cover the circuit board,
wherein the circuit board holder which is configured to cover the circuit board is arranged in a space provided above the terrace portion of the battery cell covered with the cell holder, the circuit board is configured to be arranged substantially parallel to the positive electrode lead and the negative electrode lead, and the circuit board holder includes a plurality of ribs that extend from the circuit board holder and abut on the circuit board,
wherein the circuit board holder includes:
a circuit board placement portion configured to accommodate the circuit board, and
a holder cover fitted to the circuit board placement portion in a same plane,
wherein the circuit board placed on the circuit board placement portion is covered with the holder cover which is attached to the circuit board placement portion, wherein the holder cover is configured to be bent over the circuit board placement portion.

2. The battery pack according to claim 1, wherein an arrangement of the circuit board holder is fixed by engagement of the circuit board holder and the cell holder.

3. The battery pack according to claim 1,
wherein the circuit board is accommodated in a space provided by a bottom surface of the circuit board placement portion and two wall portions each of which upwardly protrudes from both end portions of the bottom surface, and
wherein the holder cover is configured to cover an opening located above the space provided by the bottom surface and the two wall portions based on fitment of the holder cover to the circuit board placement portion that accommodates the circuit board.

4. The battery pack according to claim 1, wherein tip end portions of the plurality of ribs abut on opposite surfaces of the circuit board.

5. The battery pack according to claim 1,
wherein tip end portions of the plurality of ribs provided on a bottom surface of the circuit board placement portion abut on the circuit board, and
wherein a mounted component that is mounted onto the circuit board is arranged in a space provided between adjacent ribs of the plurality of ribs.

6. The battery pack according to claim 1, wherein the circuit board holder and the circuit board placement portion are fitted and fixed by engagement of the circuit board holder and the circuit board placement portion.

7. The battery pack according to claim 1,
wherein the holder includes a plurality of hinge portions at determined bent positions, and
wherein the circuit board holder which is configured to cover the circuit board is arranged in the space provided above the terrace portion of the battery cell covered with the cell holder with the plurality of hinge portions being bent.

8. The battery pack according to claim 1, further comprising:
an upper surface of the cell holder has a frame-like shape that covers an edge portion of an upper surface of the battery cell,
a lower surface of the cell holder has the frame-like shape that covers an edge portion of a lower surface of the battery cell,
wherein the upper surface and the lower surface of the battery cell are partially exposed in a state where the cell holder covers the battery cell.

9. The battery pack according to claim 8, wherein a thickness of the exposed portion of the battery cell is smaller than that of the cell holder.

10. The battery pack according to claim 1, wherein the plurality of ribs are located on a bottom surface of the circuit board placement portion located on a first side of the circuit board, and on a surface of the holder cover position on a second side of the circuit board opposite the first side of the circuit board such that the plurality of ribs are located on both of the opposite surfaces of the circuit board.

11. The battery pack according to claim 1, wherein the holder cover, attached to the circuit board placement portion, is bent over the circuit board placement portion by being moved about a portion from where the holder cover is attached to the circuit board placement portion.

12. The battery pack according to claim 1, wherein the holder cover includes one or more protrusions which are engaged with one or more holes in response to a determination that the holder cover is bent over the circuit board placement portion.

13. The battery pack according to claim 1, wherein the circuit board placement portion has one or more wall surfaces, wherein the height of the one or more wall surfaces are set to be larger than the length of the circuit board in a thickness direction.

14. The battery pack according to claim 13, wherein the one or more wall surfaces are provided along a short side direction to the circuit board placement portion.

15. The battery pack according to claim 7, wherein each of the plurality of hinge portions has a V-shaped groove provided along a width direction of the holder.

16. The battery pack according to claim 15, wherein the V-shaped groove has a thickness from a bottom of the V-shaped groove to an inner surface of the holder, wherein the thickness is set to about 0.2 mm.

* * * * *